(12) United States Patent
Nakamura et al.

(10) Patent No.: US 12,220,982 B2
(45) Date of Patent: Feb. 11, 2025

(54) VEHICLE LID SEAL STRUCTURE

(71) Applicant: TOYOTA JIDOSHA KABUSHIKI KAISHA, Toyota (JP)

(72) Inventors: Haruki Nakamura, Kariya (JP); Daisuke Ando, Toyota (JP); Masachika Aoki, Toyoake (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/204,488

(22) Filed: Jun. 1, 2023

(65) Prior Publication Data

US 2024/0034145 A1 Feb. 1, 2024

(30) Foreign Application Priority Data

Jul. 29, 2022 (JP) ................. 2022-121087

(51) Int. Cl.
*B60K 15/05* (2006.01)
*B60L 53/16* (2019.01)

(52) U.S. Cl.
CPC .............. *B60K 15/05* (2013.01); *B60L 53/16* (2019.02)

(58) Field of Classification Search
CPC ................. B60K 15/05; B60L 53/16
USPC ...................................... 296/97.22
See application file for complete search history.

(56) References Cited

FOREIGN PATENT DOCUMENTS

| DE | 102018217222 A1 * | 4/2019 | ......... B60R 16/0222 |
| DE | 202021003744 U1 * | 4/2022 | |
| JP | 2015009634 A * | 1/2015 | ............. B60J 10/76 |
| JP | 2021-054186 A | 4/2021 | |

OTHER PUBLICATIONS

DE-102018217222-A1 (Ogawa et al.) (Apr. 18, 2019) (Machine Translation) (Year: 2019).*
DE-202021003744-U1 (Mar. 1, 2022) (Machine Translation) (Year: 2022).*

* cited by examiner

*Primary Examiner* — Mahmoud Gimie
(74) *Attorney, Agent, or Firm* — Dinsmore & Shohl LLP

(57) ABSTRACT

In a vehicle lid seal structure, one of a housing and a lid is provided with an annular sealing member on a face facing the other. A cross-sectional structure of the annular sealing member includes a base portion and a lip portion. The base portion is attached to one of the housing and the lid. The lip portion extends from the base portion toward the other of the housing and the lid. The lip portion includes a connecting end between the lip portion and the base portion, and a free end that is an end portion opposite to the connecting end of the lip portion. Further, the lip portion is provided with a folding starting point between the connecting end and the free end. The folding starting point is provided for causing folding deformation of the lip portion toward a radially-outward side of the annular sealing member.

4 Claims, 6 Drawing Sheets

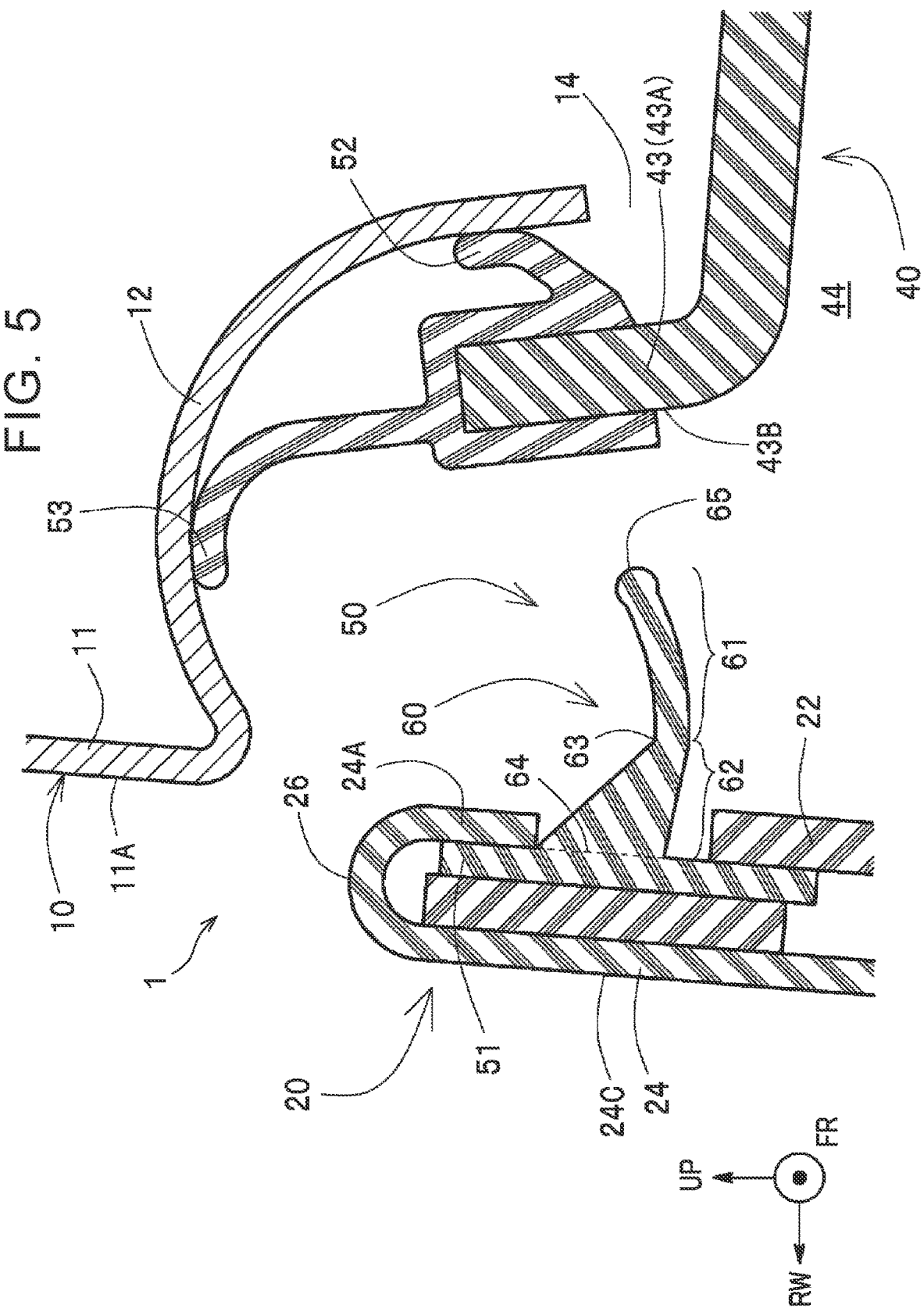

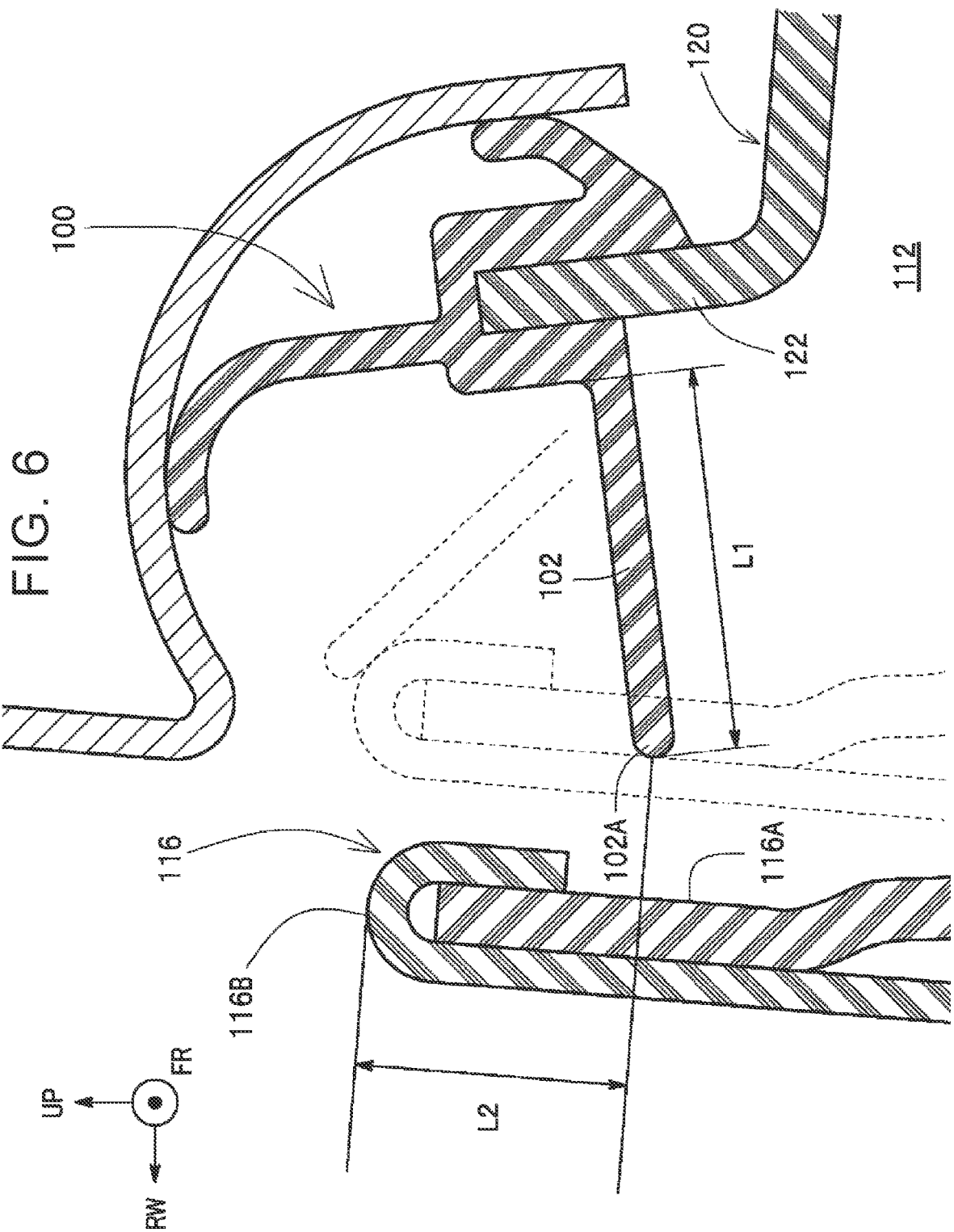

VEHICLE LID SEAL STRUCTURE

CROSS-REFERENCE TO RELATED APPLICATION

This application claims priority to Japanese Patent Application No. 2022-121087 filed on Jul. 29, 2022, incorporated herein by reference in its entirety.

BACKGROUND

1. Technical Field

A vehicle lid seal structure is disclosed in the present specification.

2. Description of Related Art

A lid seal structure is disclosed in, for example, Japanese Unexamined Patent Application Publication No. 2021-54186 (JP 2021-54186 A). As exemplified in FIG. 6, a sealing member 100 is provided to a housing 120, in order to enhance sealing performance between the housing 120 and a lid 116. The housing 120 accommodates an electric power feed port (omitted from illustration). The lid 116 opens and closes an opening 112 of the housing 120. A flange 122, which is annular in form, is formed on a peripheral edge portion of the housing 120. The sealing member 100, which is annular in form, is attached to this flange 122. The sealing member 100 has a lip portion 102. The lip portion 102 extends from the flange 122 side toward the lid 116 side. The opening 112 of the housing 120 is sealed by the lip portion 102 and an inner face 116A of the lid 116 (a face facing the housing 120) coming into contact.

SUMMARY

Now, in a process of the lid 116 closing the opening 112, a distal end 102A of the lip portion 102 comes into contact with the inner face 116A of the lid 116. The lip portion 102 is made of a flexible member, and deforms as the lid 116 moves toward the opening 112 (closing side). During this deformation process, the distal end 102A of the lip portion 102 slides over the inner face 116A of the lid 116.

In doing so, when a distance L2, from a point at which the distal end 102A of the lip portion 102 first comes into contact with the inner face 116A of the lid 116, to the peripheral edge 116B of the lid 116, is shorter than a length L1 of the lip portion 102, the distal end 102A of the lip portion 102 may extend beyond the peripheral edge 116B of the lid 116, as indicated by the dashed line. In such a case, rainwater or the like may enter the opening 112 from between the distal end 102A of the lip portion 102 and the peripheral edge 116B of the lid 116.

The present disclosure provides a vehicle lid seal structure that is capable of improving sealing performance.

A vehicle lid seal structure is disclosed in the present disclosure. This vehicle lid seal structure includes a housing and a lid. The housing is provided with a refueling port or an electric power feed port. The lid is configured to open and close an opening of the housing. One of the housing and the lid is provided with an annular sealing member, on a face facing the other. A cross-sectional structure of the annular sealing member includes a base portion and a lip portion. The base portion is attached to one of the housing and the lid. The lip portion extends from the base portion toward the other of the housing and the lid. The lip portion has a connecting end and a free end. The connecting end thereof is an end portion of the lip portion that is connected to the base portion. The free end is the end portion of the lip portion opposite to the connecting end. Further, the lip portion is provided with a folding starting point between the connecting end and the free end. The folding starting point is provided for causing folding deformation of the lip portion toward a radially-outward side of the annular sealing member.

By providing the folding starting point between the connecting end and the free end of the lip portion as described above, the lip portion is bent and deformed at the folding starting point. In this case, the free end, which is the distal end of the lip portion, is less likely to extend beyond a peripheral edge of the lid, as compared to a case in which the lip portion is folded from the connecting end.

Also, in the above configuration, the lip portion may extend from the free end toward the folding starting point, being inclined toward a radially-inward side of the annular sealing member.

According to the above configuration, a longer distance can be secured from the folding starting point to the peripheral edge of the lid, as compared to a case in which the lip portion extends parallel to a central axis of the annular sealing member.

Also, in the above configuration, a substructure portion of the lip portion that extends from the folding starting point to the connecting end may be higher in rigidity than a distal end portion that extends from the free end to the folding starting point.

According to the above configuration, bending of the lip portion at the connecting end side from the folding starting point is suppressed.

Also, in the above configuration, the substructure portion of the lip portion may extend from the folding starting point toward the connecting end, being inclined toward the radially-outward side of the annular sealing member.

According to the above configuration, the distal end portion of the lip portion that extends from the folding starting point to the free end can be stably bent toward the radially-outward side of the annular sealing member.

Also, in the above configuration, the annular sealing member may be attached to a flange that is annular. The flange may be provided on a peripheral edge portion of the housing and face the lid. The substructure portion of the lip portion may include an outer peripheral side face and an inner peripheral side face. Both the outer peripheral side face and the inner peripheral side face may be inclined upward from the folding starting point toward the connecting end. Further, an upward inclination angle of the inner peripheral side face may be smaller than an upward inclination angle of the outer peripheral side face.

According to the above configuration, rigidity of the substructure portion can be improved while maintaining the substructure portion in an inclined arrangement.

According to the vehicle lid seal structure according to the present disclosure, sealing performance can be improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is a perspective view exemplifying a vehicle lid seal structure according to another example of the embodiment; and FIG. 6 is a perspective view exemplifying a vehicle lid seal structure according to related art.

DETAILED DESCRIPTION OF EMBODIMENTS

A vehicle lid seal structure according to an embodiment will be described below with reference to the drawings. The shapes, materials, numbers, and numerical values described below are exemplifications for the sake of description, and can be changed as appropriate according to specifications of the vehicle lid seal structure. Also, in the following, like elements are denoted by the same signs in all drawings.

Also, in FIGS. 1 to 6, an orthogonal coordinate system made up of a FR axis, a RW axis, and an UP axis is used to represent positions and directions of the components. The FR axis is a vehicle front-rear direction axis, of which a forward direction of a vehicle is the positive direction. The RW axis is a vehicle width direction axis, of which a right side of the vehicle is the positive direction. The UP axis is a vehicle up-down direction axis, of which upward in the vehicle is the positive direction.

Figure 1:
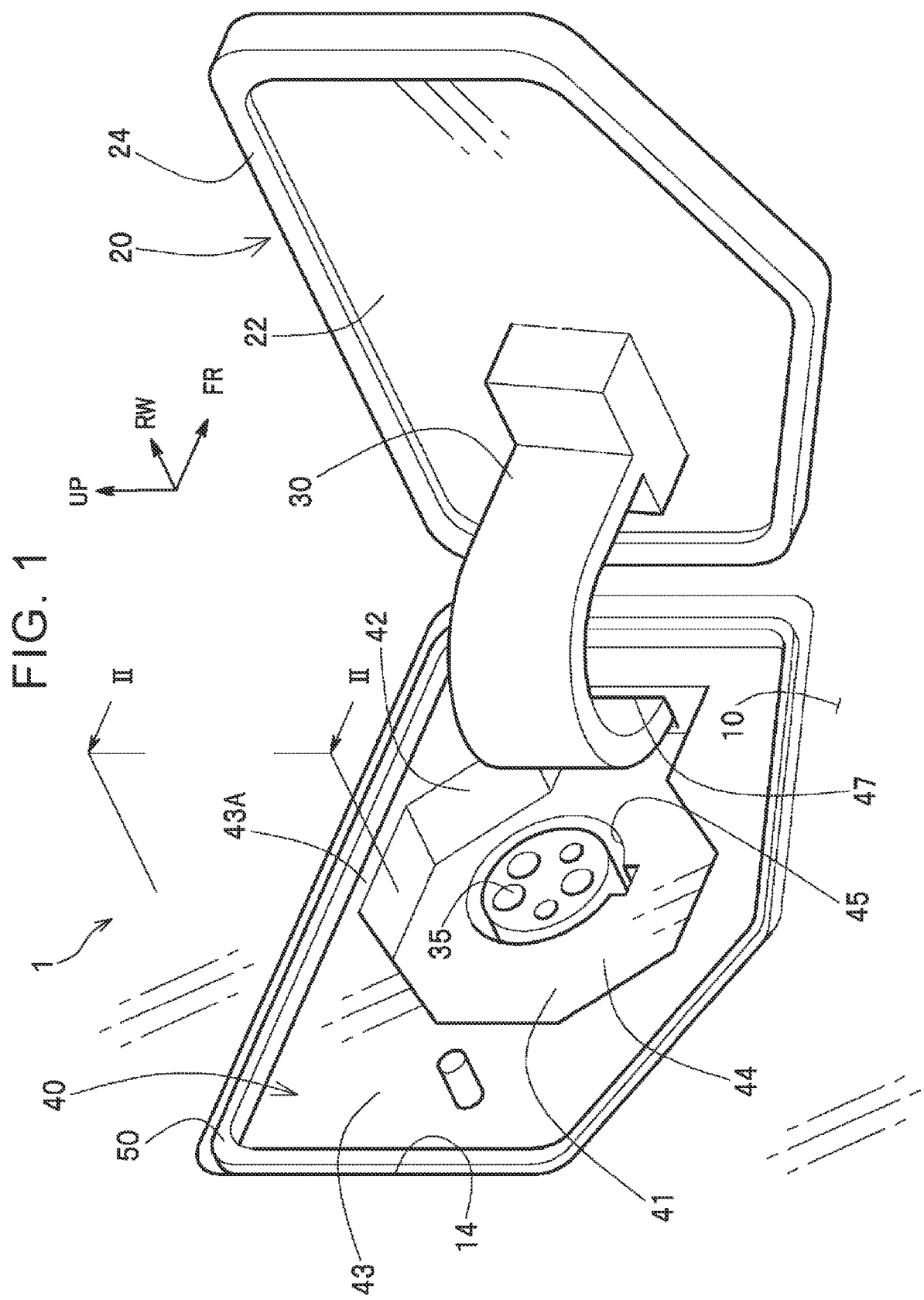
FIG. 1 is a perspective view exemplifying a vehicle lid seal structure according to an embodiment.

As illustrated in FIG. 1, a vehicle lid seal structure 1 according to the present embodiment includes a lid 20, a housing 40, and an annular sealing member 50.

This lid seal structure 1 is provided on an outer panel 10. The outer panel 10 is a panel plate member having an aesthetic surface (exposed surface 11A in FIG. 2) of the vehicle, and is a quarter panel or a fender panel, for example. A through hole 14 is formed in the outer panel 10. The lid seal structure 1 according to the present embodiment is fit into this through hole 14.

Figure 2:
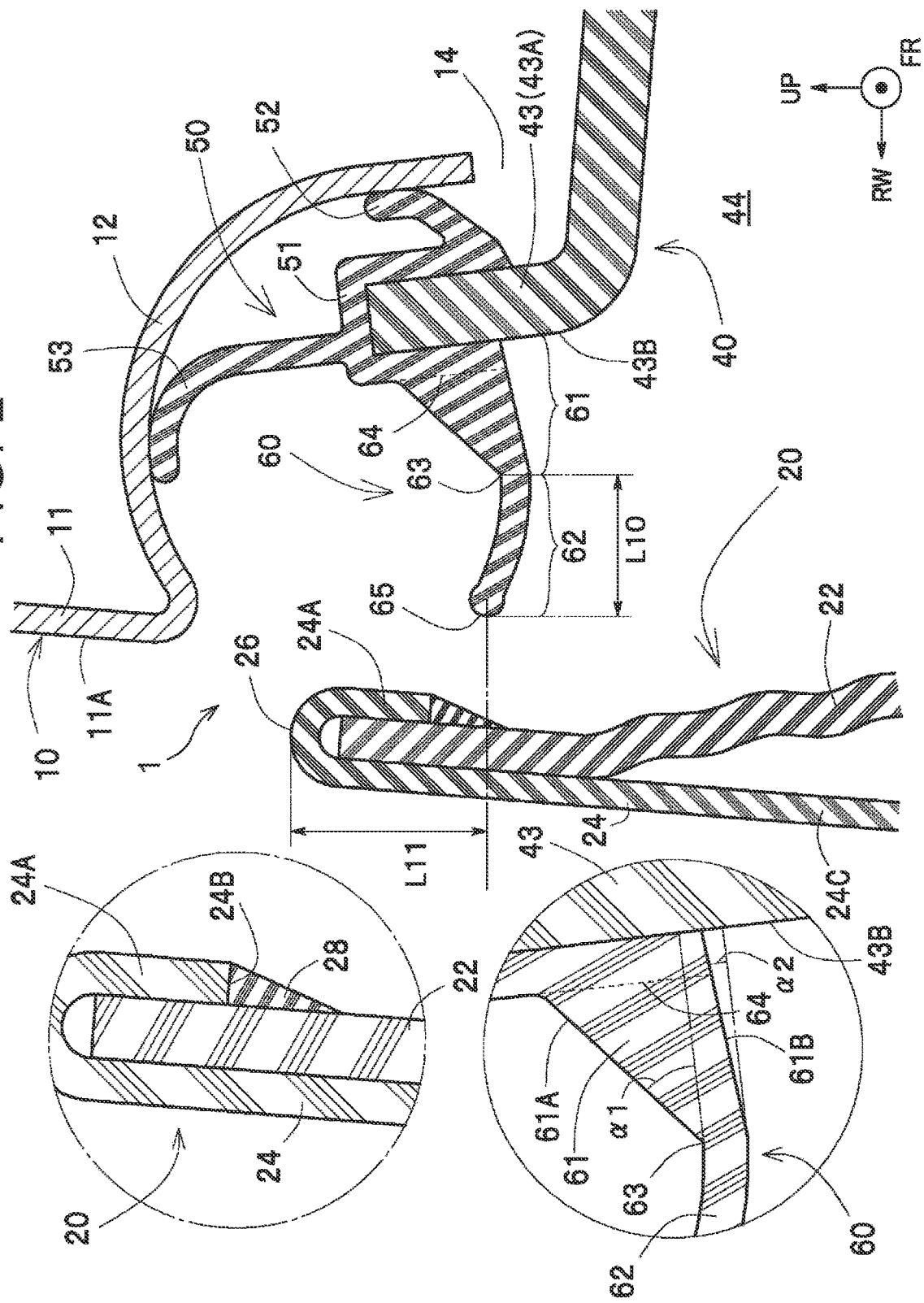
FIG. 2 is a cross-sectional view taken along line II-II in FIG. 1.

FIG. 2 exemplifies a cross-section taken along line II-II in FIG. 1. The outer panel 10 includes a main plate 11 having the exposed surface 11A, and a flange 12 folded back from the main plate 11 toward an inner side in the vehicle width direction. For example, the flange 12 is formed in an annular form and has the through hole 14 bored therein.

The housing 40 is inserted into the through hole 14. The housing 40 is provided with a refueling port or an electric power feed port. The housing 40 is a member having a form like a tray, and is provided with an opening 44 exposed outward in the vehicle width direction. The housing 40 includes a bottom wall 41, a side wall 42, and a flange 43.

The bottom wall 41 is situated further inward in the vehicle width direction than the exposed surface 11A of the outer panel 10. A through hole 45 is formed in the bottom wall 41 in a thickness direction thereof. An electric power feed port 35 is provided in the through hole 45. The electric power feed port 35 can be connected to a charging connector (omitted from illustration) of an external charging facility, for example.

The side wall 42 extends in the vehicle width direction from a peripheral edge of the bottom wall 41. An arm hole 47, into which an arm 30 is inserted, is formed in the side wall 42 on the vehicle forward side.

The flange 43 is connected to an outer end portion of the side wall 42 in the vehicle width direction. The flange 43 is provided on a peripheral edge portion of the housing 40 and has an annular form surrounding the bottom wall 41. The form of the flange 43 is determined in accordance with the form of the through hole 14 surrounding outside of the flange 43 and the form of the bottom wall 41 inside the flange 43.

An upper portion of the flange 43 is provided with a narrow portion 43A that is interposed between an upper edge of the through hole 14 and the bottom wall 41, for example. The narrow portion 43A is formed such that a width of flaring from the side wall 42 is narrower than any other portion of the flange 43.

The annular sealing member 50 is fitted onto an outer periphery of the flange 43, as illustrated in FIG. 2 which will be described later. At the narrow portion 43A of the flange 43, a distance L11 from a portion where a free end 65 first comes into contact with an inner face of the lid 20, to a peripheral edge 26, is shorter than other portions. The lid seal structure 1 according to the present embodiment can be applied to such a narrow portion 43A. Note that FIGS. 3 to 5 also exemplify the cross-sectional structure of the narrow portion 43A as a cross-section taken along line II-II in FIG. 1, in the same way as in FIG. 2.

The lid 20 is capable of opening and closing the opening 44 of the housing 40. The lid 20 has a form corresponding to the opening form of the through hole 14 of the outer panel 10. Further, for example, the lid 20 includes a lid outer member 24 that is an outer plate thereof and a lid inner member 22 that is an inner plate thereof. The lid inner member 22 and the lid outer member 24 are made of a resin material or a metal material, for example.

Referring to FIG. 1, an end portion of the arm 30 is connected to the lid inner member 22. The other end of the arm 30 is slidably accommodated in a guide mechanism, which is omitted from illustration, through the arm hole 47. The lid outer member 24 is formed one size larger than the lid inner member 22. A peripheral edge portion of the lid outer member 24 is folded back to form a folded-back portion 24A. Referring to FIG. 2, the lid inner member 22 is gripped by the lid outer member 24, by this folded-back portion 24A.

As illustrated in an enlarged illustration in a circle at the upper left in FIG. 2, the lid outer member 24 is folded back at the folded-back portion 24A, and a terminal end 24B thereof faces toward the center of the lid 20. Due to the plate thickness of the lid outer member 24, a stepped structure is formed between the terminal end 24B and the lid inner member 22.

This stepped structure is provided on a sliding path along which the free end 65 of a lip portion 60 of the annular sealing member 50 slides, which will be described later. As illustrated in the enlarged illustration in the circle at the upper left in FIG. 2, a slope 28 is formed that is inclined toward an inner face of the lid inner member 22 (a face facing the housing 40) at the terminal end 24B, in order to keep the free end 65 from being caught on the stepped structure.

Referring to FIG. 1, the annular sealing member 50 is provided on the flange 43 of the housing 40. The annular sealing member 50 is a waterproof sealing member made of a flexible material such as rubber, for example.

Referring to FIG. 2, a cross-sectional structure of the annular sealing member 50 includes a base portion 51, and a plurality of lip portions 52, 53, and 60. The base portion 51 is a member with a letter-U cross-sectional form, and is attached to the flange 43 of the housing 40. For example, the base portion 51 is attached to the flange 43 so as to cover an outer peripheral edge of the flange 43.

The lip portion 53 extends upward from an upper end portion of the base portion 51. Also, a lip portion 52 extends inward in the vehicle width direction from an inner face of the base portion 51 in the vehicle width direction. Both terminal ends of the lip portions 52 and 53 abut the flange 12 of the outer panel 10.

The lip portion 60 is a so-called water stop lip, and extends further outward in the vehicle width direction from an outer face of the base portion 51 in the vehicle width direction. In other words, the lip portion 60 extends from a connecting end 64, between the lip portion 60 and the base portion 51, toward the lid 20. The end portion of the lip portion 60 opposite to the connecting end 64 is the free end 65.

Further, the lip portion 60 is provided with a folding starting point 63 between the connecting end 64 and the free end 65, to cause folding deformation of the lip portion 60 toward a radially-outward side of the annular sealing member 50. Referring to an enlarged illustration in a circle at the lower left in FIG. 2, the folding starting point 63 is a bending point provided on an outer peripheral side face 61A of the lip portion 60, for example.

For example, the lip portion 60 includes a substructure portion 61 and a distal end portion 62, with the folding starting point 63 as a boundary thereof. As exemplified in FIG. 2, the substructure portion 61 is configured so as to have a higher rigidity than the distal end portion 62. For example, the substructure portion 61 is formed thicker than the distal end portion 62. More specifically, the substructure portion 61 has a spreading form that gradually increases in thickness from the folding starting point 63 toward the connecting end 64. Making the substructure portion 61 more rigid than the distal end portion 62 suppresses bending of the substructure portion 61.

Also, the lip portion 60 has a boomerang-like structure that protrudes downward, as exemplified in FIG. 2. For example, the distal end portion 62 of the lip portion 60 extends from the free end 65 toward the folding starting point 63 so as to be inclined toward a radially-inward side of the annular sealing member 50. Further, the substructure portion 61 extends from the folding starting point 63 toward the connecting end 64 so as to be inclined toward the radially-outward side of the annular sealing member 50. According to such a configuration, the folding starting point 63 can be situated further away from the peripheral edge 26 of the lid 20 as compared to a case in which the lip portion 60 extends parallel to the vehicle width direction axis, for example.

Also, the lip portion 60 has a form that protrudes downward, i.e., has a form that folds toward the radially-inward side of the annular sealing member 50. Due to such a form, as exemplified in FIG. 4, when the lid 20 is closed, the folding starting point 63 of the lip portion 60 is folded inwardly so as to be on the radially-inward side of the annular sealing member 50 as compared to the free end 65. Such inward folding suppresses the free end 65 of the lip portion 60 from extending beyond the peripheral edge 26 of the lid 20.

Further, the substructure portion 61 is extended so as to be inclined toward the radially-outward side of the annular sealing member 50. Accordingly, the outer peripheral side face 61A and an inner peripheral side face 61B of the substructure portion 61 are both formed to incline upward from the folding starting point 63 toward the connecting end 64, as exemplified in the enlarged illustration in the circle at the lower left in FIG. 2.

In addition, the substructure portion 61 is formed in a spreading form that increases from the folding starting point 63 toward the connecting end 64, and accordingly an upward inclination angle $\alpha 2$ of the inner peripheral side face 61B is set so as to be smaller than an upward inclination angle $\alpha 1$ of the outer peripheral side face 61A. Note that the upward inclination angles $\alpha 1$ and $\alpha 2$ are defined as inclination angles with respect to a perpendicular line of a counterface 43B of the flange 43 facing the lid 20.

Thus, the lip portion 60 has the folding starting point 63 formed between the free end 65 and the connecting end 64. Furthermore, the lip portion 60 has the folding starting point 63 set at a downward bending point (i.e., a radially-inward bending point) of the lip portion 60. In other words, the folding starting point 63 is set to be on the radially-inward side of the annular sealing member 50. Due to having such a structure, a movable length L10 of the lip portion 60 can be set to be shorter than the distance L11 from the point where the free end 65 first comes into contact with the inner face of the lid 20, to the peripheral edge 26. As a result, the free end 65 is suppressed from extending beyond the peripheral edge 26 of the lid 20.

Figure 3:
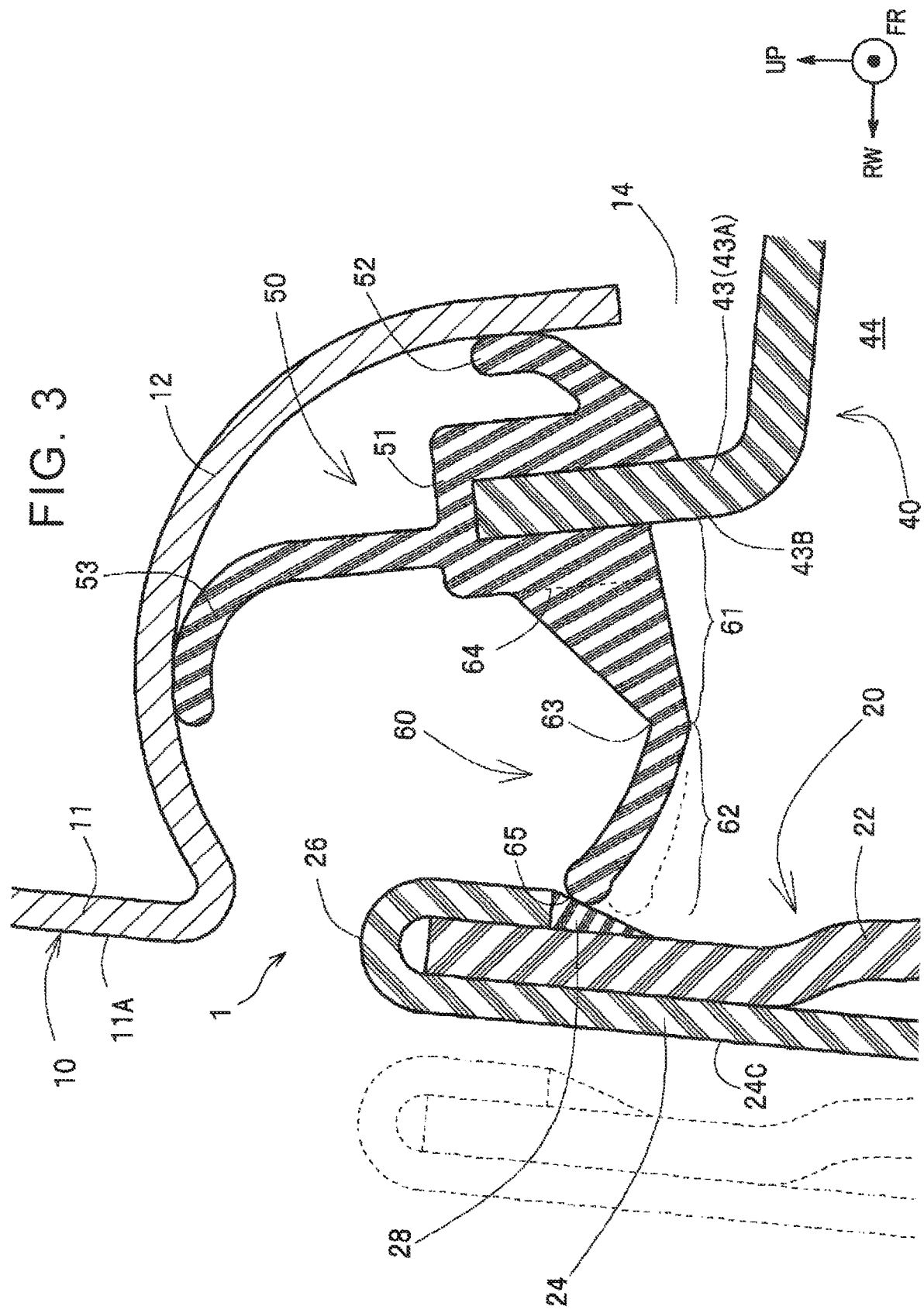
FIG. 3 is a diagram exemplifying a lid closing process (1/2)
Figure 4:
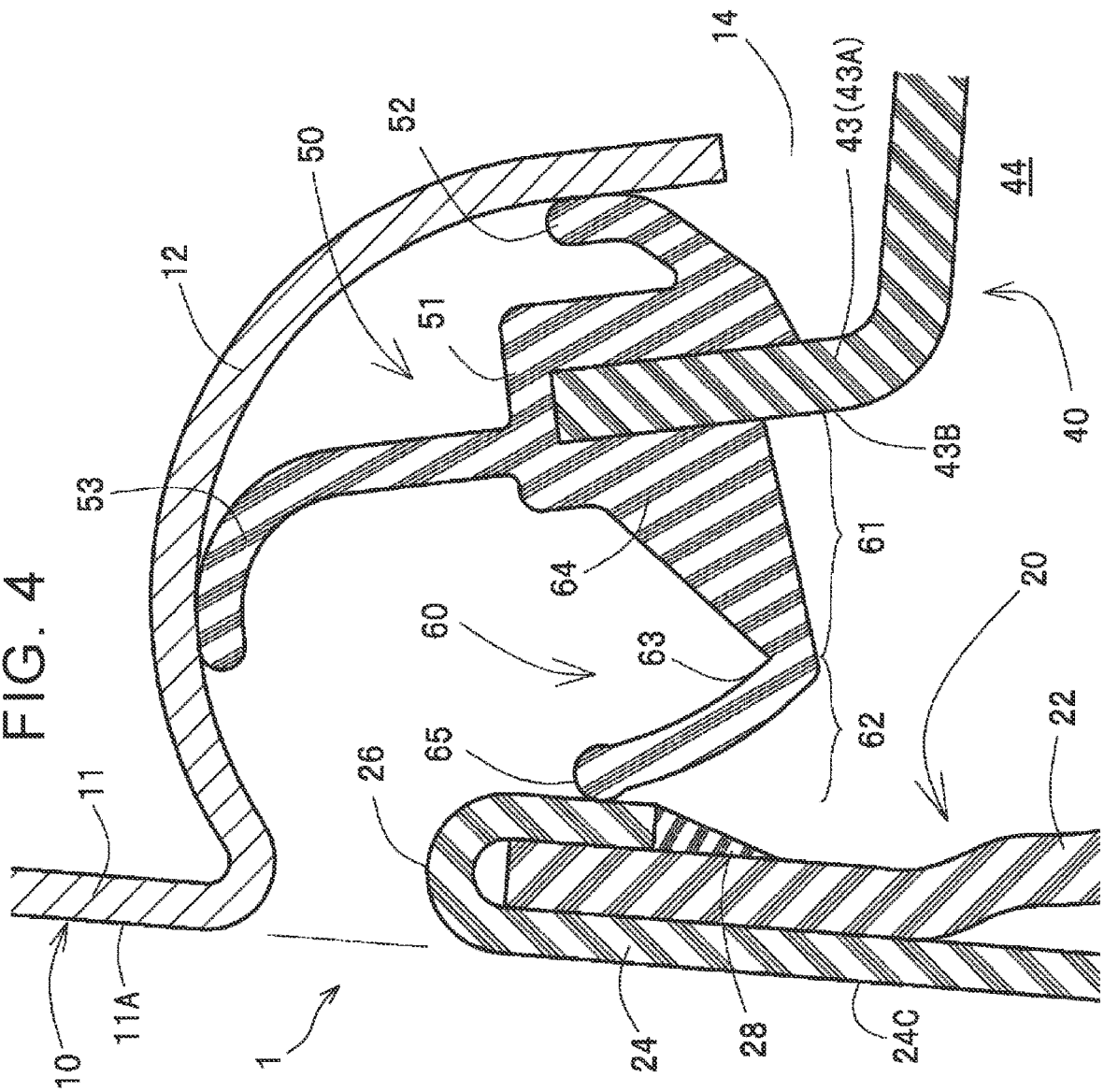
FIG. 4 is a diagram exemplifying the lid closing process (2/2)

FIGS. 3 and 4 exemplify a closing process of the lid 20. During the closing process, the free end 65 of the lip portion 60 comes into contact with the inner face of the lid inner member 22. Further referring to FIG. 3, as the lid 20 moves toward the housing 40, the free end 65 bends toward the radially-outward side of the annular sealing member 50 from the folding starting point 63, while sliding over the inner face of the lid inner member 22.

The slope 28 is formed on the path along which the free end 65 slides over the inner face of the lid inner member 22, in order to resolve the stepped structure created by the terminal end 24B of the lid outer member 24 (see FIG. 2). The free end 65 slides over the inclined surface of the slope 28, and crosses over the stepped structure.

Further referring to FIG. 4, the position where an exposed surface 24C of the lid outer member 24 and the exposed surface 11A of the outer panel 10 are flush on the same plane is the closed position of the lid 20. As illustrated in FIG. 4, the free end 65 of the lip portion 60 is located closer to the center of the opening 44 than the peripheral edge 26 of the lid 20, and thus is kept from extending beyond the peripheral edge 26.

Other Embodiments

Note that while in the embodiment exemplified in FIG. 1, the electric power feed port 35 is provided in the housing 40, the lid seal structure 1 according to the present embodiment is not limited to this form. For example, a refueling port may be provided in the housing 40 instead of the electric power feed port 35.

Further, in the embodiment exemplified in FIGS. 1 to 4, the housing 40 is provided with the annular sealing member 50, but the lid seal structure 1 according to the present embodiment is not limited to this form. In short, it is sufficient for the annular sealing member 50 to be provided on one of the housing 40 and the lid 20.

That is to say, the annular sealing member 50 is provided on one of the faces of the housing 40 and the lid 20 that faces the other. More specifically, the base portion 51 of the annular sealing member 50 is attached to one of housing 40 and lid 20. The lip portion 60 extends from the base portion 51 toward the other of the housing 40 and the lid 20.

FIG. 5 illustrates an example in which the lid 20 is provided with the annular sealing member 50. In this example, the base portion 51 has a form of a flat plate, and is gripped between the lid outer member 24 and the lid inner member 22. For example, the lid inner member 22 is formed with an insertion hole for the base portion 51. Also, the base portion 51 is interposed between the folded-back portion 24A of the lid outer member 24.

In this example, the lip portion 60 extends from base portion 51 toward the housing 40. The lip portion 60 also includes the free end 65. The free end 65 is an end portion facing the connecting end 64 of connection to the base portion 51. Further, the lip portion 60 is provided with the folding starting point 63 between the connecting end 64 and the free end 65. The folding starting point 63 is provided for causing folding deformation of the lip portion 60 toward the radially-outward side of the annular sealing member 50.

What is claimed is:

1. A vehicle lid seal structure, comprising:
   a housing that is provided with a refueling port or an electric power feed port; and
   a lid configured to open and close an opening of the housing, wherein:
   one of the housing and the lid is provided with an annular sealing member, on a face facing the other;
   a cross-sectional structure of the annular sealing member includes a base portion attached to one of the housing and the lid, and a lip portion extending from the base portion toward the other of the housing and the lid;
   an end portion of the lip portion on a side opposite to a connecting end of the lip portion and the base portion is a free end; and
   the lip portion is provided with a folding starting point between the connecting end and the free end, to cause folding deformation of the lip portion toward a radially-outward side of the annular sealing member,
   wherein a substructure portion of the lip portion that extends from the folding starting point to the connecting end is higher in rigidity than a distal end portion that extends from the free end to the folding starting point,
   wherein the substructure portion of the lip portion extends from the folding starting point toward the connecting end, being inclined toward the radially-outward side of the annular sealing member, and
   wherein:
   the annular sealing member is attached to a flange that is annular;
   the flange is provided on a peripheral edge portion of the housing and faces the lid;
   the substructure portion of the lip portion includes an outer peripheral side face and an inner peripheral side face;
   both the outer peripheral side face and the inner peripheral side face are inclined upward from the folding starting point toward the connecting end; and
   an upward inclination angle of the inner peripheral side face is smaller than an upward inclination angle of the outer peripheral side face.

2. The vehicle lid seal structure according to claim 1, wherein the lip portion extends from the free end toward the folding starting point, being inclined toward a radially-inward side of the annular sealing member.

3. The vehicle lid seal structure according to claim 1, wherein:
   the lip portion is a first lip portion,
   the annular sealing member further comprises at least one second lip portion,
   a folding starting point is absent in the at least one second lip portion,
   the second lip portion extends from the base portion to the housing, and
   the first lip portion extends from the base portion to the lid.

4. The vehicle lid seal structure according to claim 1, wherein the lip portion is provided at the housing and the free end of the lip portion is located closer to a center of the opening than the lid.

\* \* \* \* \*